US011710358B2

(12) United States Patent
Vaccariello et al.

(10) Patent No.: US 11,710,358 B2
(45) Date of Patent: Jul. 25, 2023

(54) TIME-OF-FLIGHT VEHICLE USER LOCALIZATION

(71) Applicant: Ford Global Technologies, LLC, Dearborn, MI (US)

(72) Inventors: Andrew Vaccariello, Plymouth, MI (US); Vivekanandh Elangovan, Canton, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/157,703

(22) Filed: Jan. 25, 2021

(65) Prior Publication Data
US 2022/0237965 A1 Jul. 28, 2022

(51) Int. Cl.
*G07C 9/00* (2020.01)
*G01S 5/02* (2010.01)
*H01Q 1/32* (2006.01)

(52) U.S. Cl.
CPC ........ *G07C 9/00309* (2013.01); *G01S 5/0284* (2013.01); *H01Q 1/3241* (2013.01); *G07C 2009/00333* (2013.01); *G07C 2009/00357* (2013.01)

(58) Field of Classification Search
CPC ...... G07C 9/00309; G07C 2009/00333; G07C 2009/00357; G01S 5/0284; H01Q 1/3241
USPC ....................................................... 340/5.61
See application file for complete search history.

(56) References Cited

U.S. PATENT DOCUMENTS

| 9,563,990 | B2* | 2/2017 | Khan | G07C 9/00 |
| 9,751,497 | B2* | 9/2017 | Sanji | G07C 9/00 |
| 9,764,699 | B2* | 9/2017 | Siswick | G07C 9/00309 |
| 9,769,627 | B2* | 9/2017 | Siswick | H04W 4/40 |
| 9,886,805 | B1* | 2/2018 | Bianchi, III | G07C 9/00896 |
| 9,894,492 | B1* | 2/2018 | Elangovan | H04W 4/40 |
| 9,894,613 | B2* | 2/2018 | Scheim | G07C 9/00309 |
| 10,328,899 | B2* | 6/2019 | Golsch | B60R 25/245 |
| 10,573,104 | B2* | 2/2020 | Jain | G01S 13/765 |
| 11,153,708 | B2* | 10/2021 | Smith | G01S 3/72 |
| 11,353,538 | B2* | 6/2022 | Guthrie | G01S 3/043 |
| 2018/0208155 | A1 | 7/2018 | Beyer et al. | |
| 2018/0339676 | A1* | 11/2018 | Lazarini | H04W 4/40 |
| 2021/0061225 | A1* | 3/2021 | Ahmed | H04W 4/40 |

FOREIGN PATENT DOCUMENTS

WO 2020002392 A1 1/2020

OTHER PUBLICATIONS

NXP, "UWB at the intersection of the vehicle, mobile, and consumer devices," NXP UWB Solutions, Mar. 11, 2020, 3 pages.
Continental, "More Convenient and Secure Keyless Vehicle Access," Continental AG,2020, 7pages.

* cited by examiner

*Primary Examiner* — Nam V Nguyen
(74) *Attorney, Agent, or Firm* — Frank Lollo; Eversheds Sutherland (US) LLP

(57) ABSTRACT

A method for localizing a user device using a Time of Flight (ToF) antenna array disposed on a vehicle, the method includes determining, via a ToF localization controller, that the user device is less than a threshold distance from the vehicle, determining an angle of arrival via the ToF localization controller and the ToF antenna array, and generating an unlock signal that unlocks a vehicle door responsive to determining that the user device is less than the threshold distance from the vehicle door.

17 Claims, 9 Drawing Sheets

|  | LOS | 2m | 3m | 4m |
|---|---|---|---|---|
| 0° | Tag 0 | 3.37 | 4.51 | 5.46 |
|  | Tag 1 | 0.00 | 0.00 | 0.00 |
|  | Tag 2 | 3.13 | 4.20 | 5.59 |
|  | Tag 3 | 0.00 | 0.00 | 0.00 |
|  | Tag 4 | 4.18 | 5.40 | 6.55 |
|  | Tag 5 | 5.14 | 6.52 | 7.26 |
|  | Tag 6 | 6.83 | 7.60 | 7.32 |

FIG. 6

| Measurement Anchor Location | Measurement Tag (0-6) | 1 ft | 1 m |
|---|---|---|---|
| 0° | Driver Side Front Fender (0) | 1.85 | 2.49 |
|  | Driver Side Rear Fender (1) | 5.45 | 6.33 |
|  | Passenger Side Front Fender (2) | 1.83 | 2.48 |
|  | Passenger Side Rear Fender (3) | 5.81 | 6.30 |
|  | Center Console (4) | 3.10 | 3.84 |
|  | Headliner (5) | 3.96 | 4.56 |
|  | Cargo Door (6) | 4.93 | 6.10 |

FIG. 7

TIME-OF-FLIGHT VEHICLE USER LOCALIZATION

TECHNICAL FIELD

The present disclosure relates to mobile device localization, and more particularly, to mobile device localization using a Time-of-Flight (ToF) localization device.

BACKGROUND

Some antenna transmission radio technologies utilize low energy levels for short-range, high-bandwidth communications over a large bandwidth (e.g., >500 MHz) of the unlicensed radio spectrum. Some wireless applications are used for target sensor data collection, precision localization of devices, and tracking applications.

One example wireless technology uses radio device localization by determining a ToF of the transmission at various frequencies using radio systems. In some conventional applications, human body signal absorption and other signal impediments may significantly impact system performance, which can skew the Received Signal Strength Indicator (RSSI) measurement, which can adversely affect device localization.

With a cooperative symmetric two-way metering technique, distances can be measured to high resolution and accuracy. This feature may overcome signal loss due to human absorption, among other causes of signal loss. The use of multiple antenna systems may increase transmission range by exploiting distributed antennas among multiple nodes in an antenna array. Distributed antenna arrays may increase the transmission range and increase system throughput and reception reliability.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 6 is a table of measurement tag distances at 0° with respect to MIMO antenna arrays in accordance with the present disclosure.

FIG. 7 is a table of measurement tag distances at 0° with respect to MIMO antenna arrays in accordance with the present disclosure.

DETAILED DESCRIPTION

Overview

Figure 1:
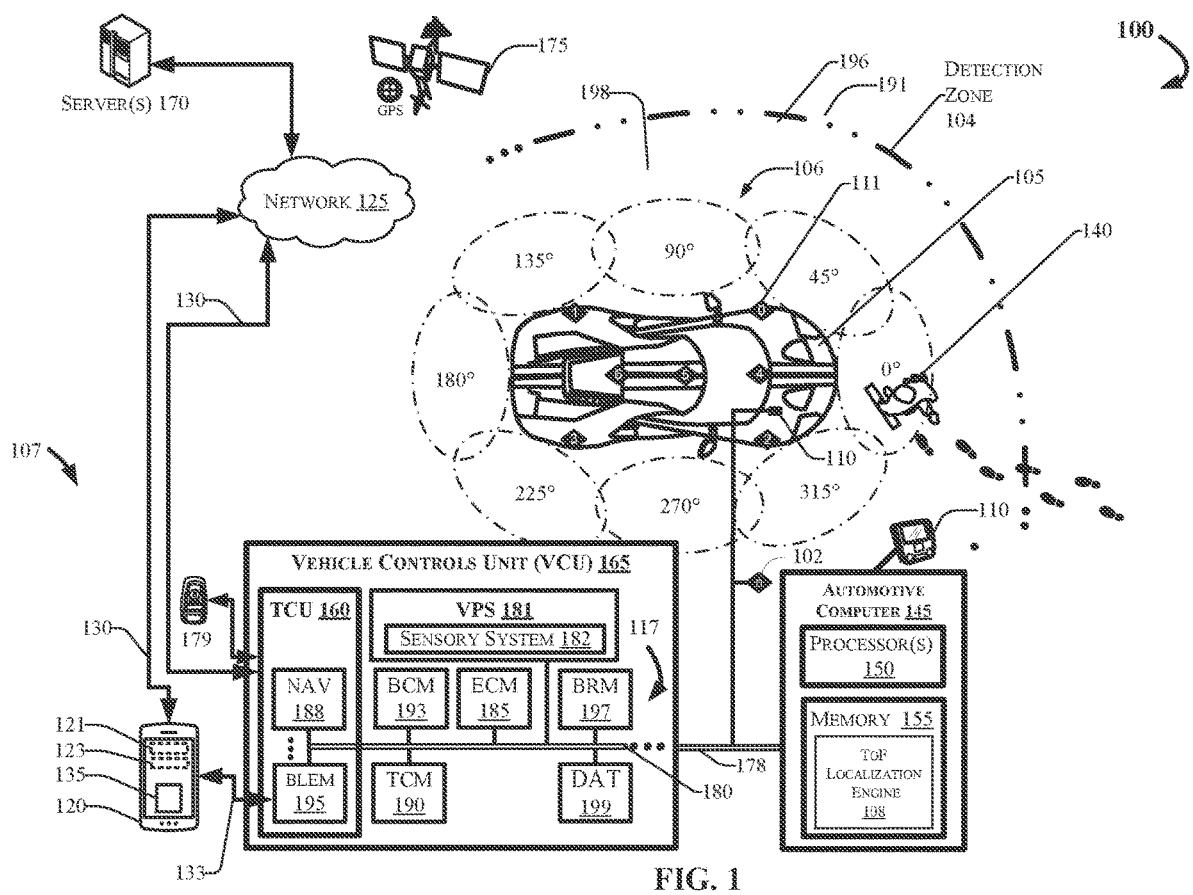
FIG. 1 depicts an example computing environment in which techniques and structures for providing the systems and methods disclosed herein may be implemented.

The disclosure will be described more fully hereinafter with reference to the accompanying drawings, in which example embodiments of the disclosure are shown, and not intended to be limiting.

Disclosed is a method to determine a specific region in which a wireless device (e.g., a user's phone) is located with respect to a vehicle. Incorporating ToF enables the use of Time-of-Flight (ToF) between two ToF devices, which communicates between the devices at a high frequency. ToF measures the time taken for the high frequency signal to go back and forth between the two devices. In some aspects, the ToF may be based on Roundtrip Time (RTT), less an empirically established and known fixed delay time in the transponder module of the sending and receiving devices. The method implements multiple ToF modules disposed at the vehicle that use ToF to develop an algorithm that locates a ToF device for 360° of coverage around the vehicle, and determines if that device is inside or outside of the vehicle. The algorithm may use, for example, seven modules to do this, but it may still be able to locate and tag the ToF device even if some of the modules fail to communicate with it. These determinations may differ based on whether the user is within or outside of a predetermined threshold distance of the vehicle.

Although described as processes and infrastructures for localization of a user device using ToF where a user may be carrying the user device, it should be appreciated that the disclosed system and methods may interchangeably refer to localization of the user carrying the user device, and/or localization of the user device where the user may or may not be present.

For localization outside the predetermined threshold, the system may test four operating range logical OR conditions to determine if the device is at the 0° region (front of the vehicle). If one of the four checks pass, the user is determined to be at the 0° region. If all four checks fail, the system may determine that the user device is not positioned at the 0° region. The system may then cause the algorithm to check if the user is at the next region, the 45° region.

The OR conditions start with check 1, which determines if the user device distance to Tag 0 is less than the user's distance to all interior Tags, AND the user's distance to Tag 2 is less than the user device distance to all interior Tags, AND the user device distance to Tag 6 is less than 7 meters, for example, AND Tag 1 & Tag 3 fail to communicate with the user device If yes (e.g., all of the Check #1 conditions are met), the system determines that the user device is localized at the 0° region at the front of the vehicle, and the system proceeds with a distance calculation. If no, the system can proceed to check 2.

Check 2 determines if the user device distance to Tag 5 is the maximum distance out of all seven Tags. Responsive to an affirmative determination of distance, the system determines that the user device is positioned at the front of the vehicle. Responsive to a negative determination, the system proceeds to Check 3.

Check 3 determines if the user's distance to Tag 6 is the maximum distance out of all seven Tags AND Tag 1 & Tag 3 fail to communicate with the user's ToF device. Responsive to a positive determination, the system determines that the user device is positioned at the front of the vehicle.

Check 4 determines whether the distance to the Tag 0 is greater than a predetermined threshold distance (e.g., 11 m, 10.5 m, 10 m, etc.). Responsive to a positive determination that the distance from Tag 0 to the user device exceeds the threshold distance, the system determines that the user device is localized at 0°, and proceeds to perform a distance calculation.

Responsive to a negative determination (e.g., the distance between Tag 0 and the user device is greater than the threshold distance), the system determines that the user device is not localized at 0°. The system may then move to the next 45° position.

For localization at distances under the predetermined threshold, the system may further test four AND conditions. Unlike the localization performed when the device is over the predetermined threshold, if all of the four checks pass, the user is determined to be at the 0° region. If any of the four checks fail, the user is determined not to be at the 0° region. The algorithm then moves on to check if the user is at the next region, the 45° region. Responsive to determining that the user is proximate to the vehicle at the 45° region, the system may trigger an unlock action that provides the user with vehicle access.

ILLUSTRATIVE EMBODIMENTS

FIG. 1 depicts an example computing environment 100 that can include a vehicle 105. The vehicle 105 may include an automotive computer 145, and a Vehicle Controls Unit (VCU) 165 that can include a plurality of electronic control units (ECUs) 117 disposed in communication with the automotive computer 145. A mobile device 120, which may be associated with a user 140 and the vehicle 105, may connect with the automotive computer 145 using wired and/or wireless communication protocols and transceivers. The mobile device 120 may be communicatively coupled with the vehicle 105 via one or more network(s) 125, which may communicate via one or more wireless connection(s) 130, and/or may connect with the vehicle 105 directly using near field communication (NFC) protocols, Bluetooth® protocols, Wi-Fi, Ultra-Wide Band (UWB), and other possible data connection and sharing techniques.

To categorize the position of the user when localization occurs, eight vehicle regions 106 may be defined. The vehicle regions 106 are depicted as dashed ovals surrounding the vehicle 105. These eight regions come from the 360° coverage associated with seven ToF modules 111 as illustrated by region numbers demarcated as numbered diamonds. The ToF modules 111 may provide vehicle surrounding location coverage in each of the respective vehicle regions 106 (e.g., 0°, 45°, etc.). Accordingly, each region covers approximately 45° of coverage. For example, the user 140 is shown walking into the 0° region.

The vehicle 105 may also receive and/or be in communication with a Global Positioning System (GPS) 175. The GPS 175 may be a satellite system (as depicted in FIG. 1) such as the global navigation satellite system (GLNSS), Galileo, or navigation or other similar system. In other aspects, the GPS 175 may be a terrestrial-based navigation network. In some embodiments, the vehicle 105 may utilize a combination of GPS and Dead Reckoning responsive to determining that a threshold number of satellites are not recognized.

The automotive computer 145 may be or include an electronic vehicle controller, having one or more processor (s) 150 and memory 155. The automotive computer 145 may, in some example embodiments, be disposed in communication with the mobile device 120, and one or more server(s) 170. The server(s) 170 may be part of a cloud-based computing infrastructure, and may be associated with and/or include a Telematics Service Delivery Network (SDN) that provides digital data services to the vehicle 105 and other vehicles (not shown in FIG. 1) that may be part of a vehicle fleet.

Although illustrated as a sport vehicle, the vehicle 105 may take the form of another passenger or commercial automobile such as, for example, a car, a truck, a sport utility, a crossover vehicle, a van, a minivan, a taxi, a bus, etc., and may be configured and/or programmed to include various types of automotive drive systems. Example drive systems can include various types of internal combustion engines (ICEs) powertrains having a gasoline, diesel, or natural gas-powered combustion engine with conventional drive components such as, a transmission, a drive shaft, a differential, etc. In another configuration, the vehicle 105 may be configured as an electric vehicle (EV). More particularly, the vehicle 105 may include a battery EV (BEV) drive system, or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 105 may be a manually driven vehicle, and/or be configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

A vehicle having a Level-0 autonomous automation may not include autonomous driving features.

A vehicle having Level-1 autonomy may include a single automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver that performs non-automated operations such as braking and other controls. In some aspects, with Level-2 and greater autonomous features, a primary user may control the vehicle while the user is inside of the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as accelerating past a slow-moving vehicle, while the present driver remains ready to retake control of the vehicle if the system is unable to execute the task.

Level-4 AVs can operate independently from a human driver, but may still include human controls for override operation. Level-4 automation may also enable a self-driving mode to intervene responsive to a predefined conditional trigger, such as a road hazard or a system failure.

Level-5 AVs may include fully autonomous vehicle systems that require no human input for operation, and may not include human operational driving controls.

The mobile device 120 can include a memory 123 for storing program instructions associated with an application 135 that, when executed by a mobile device processor 121, performs aspects of the disclosed embodiments. The application (or "app") 135 may be part of a ToF localization system 107, or may provide information to the ToF localization system 107 and/or receive information from the ToF localization system 107.

In some aspects, the mobile device 120 may communicate with the vehicle 105 through the one or more wireless connection(s) 130, which may be encrypted and established between the mobile device 120 and a Telematics Control Unit (TCU) 160. The mobile device 120 may communicate with the TCU 160 using a wireless transmitter (not shown in FIG. 1) associated with the TCU 160 on the vehicle 105. The transmitter may communicate with the mobile device 120 using a wireless communication network such as, for example, the one or more network(s) 125. The wireless connection(s) 130 are depicted in FIG. 1 as communicating via the one or more network(s) 125, and via one or more wireless connection(s) 133 that can be direct connection(s) between the vehicle 105 and the mobile device 120. The wireless connection(s) 133 may include various low-energy protocols including, for example, Bluetooth®, Bluetooth® Low-Energy (BLE®), UWB, Near Field Communication (NFC), or other protocols.

The network(s) 125 illustrate an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, ToF, and cellular technologies such as Time Division Multiple Access (TDMA), Code Division Multiple Access (CDMA), High Speed Packet Data Access (HSPDA), Long-Term Evolution (LTE), Global System for Mobile Communications (GSM), and Fifth Generation (5G), to name a few examples.

The automotive computer 145 may be installed in an engine compartment of the vehicle 105 (or elsewhere in the vehicle 105) and operate as a functional part of the ToF localization system 107, in accordance with the disclosure. The automotive computer 145 may include one or more processor(s) 150 and a computer-readable memory 155.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing a ToF localization program code. The memory 155 can include any one or a combination of volatile memory elements (e.g., dynamic random access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 165 may share a power bus 178 with the automotive computer 145, and may be configured and/or programmed to coordinate the data between vehicle 105 systems, connected servers (e.g., the server(s) 170), and other vehicles (not shown in FIG. 1) operating as part of a vehicle fleet. The VCU 165 can include or communicate with any combination of the ECUs 117, such as, for example, a Body Control Module (BCM) 193, an Engine Control Module (ECM) 185, a Transmission Control Module (TCM) 190, the TCU 160, a Driver Assistances Technologies (DAT) controller 199, etc. The VCU 165 may further include and/or communicate with a Vehicle Perception System (VPS) 181, having connectivity with and/or control of one or more vehicle sensory system(s) 182. In some aspects, the VCU 165 may control operational aspects of the vehicle 105, and implement one or more instruction sets received from the application 135 operating on the mobile device 120, from one or more instruction sets stored in computer memory 155 of the automotive computer 145, including instructions operational as part of the ToF localization system 107.

The TCU 160 can be configured and/or programmed to provide vehicle connectivity to wireless computing systems onboard and offboard the vehicle 105, and may include a Navigation (NAV) receiver 188 for receiving and processing a GPS signal from the GPS 175, a BLE® Module (BLEM) 195, a Wi-Fi transceiver, a ToF transceiver, and/or other wireless transceivers (not shown in FIG. 1) that may be configurable for wireless communication between the vehicle 105 and other systems, computers, and modules. The TCU 160 may be disposed in communication with the ECUs 117 by way of a bus 180. In some aspects, the TCU 160 may retrieve data and send data as a node in a CAN bus.

The BLEM 195 may establish wireless communication using Bluetooth® and BLE® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests, and connect directly with the mobile device 120, and/or one or more keys (which may include, for example, the fob 179).

The bus 180 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 180 may be or include a high speed CAN (which may have bit speeds up to 1 Mb/s on CAN, 5 Mb/s on CAN Flexible Data Rate (CAN FD)) device, and can include a low-speed or fault tolerant CAN (up to 125 Kbps) device, which may, in some configurations, use a linear bus configuration. In some aspects, the ECUs 117 may communicate with a host computer (e.g., the automotive computer 145, the ToF localization system 107, and/or the server(s) 170, etc.), and may also communicate with one another without the necessity of a host computer. The bus 180 may connect the ECUs 117 with the automotive computer 145 such that the automotive computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. The ECUs 117 described with respect to the VCU 165 are provided for example purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human drivers, inputs from an autonomous vehicle controller, the ToF localization system 107, and/or via wireless signal inputs received via the wireless connection(s) 133 from other connected devices such as the mobile device 120, among others. The ECUs 117, when configured as nodes in the bus 180, may each include a central processing unit (CPU), a CAN controller, and/or a transceiver (not shown in FIG. 1). For example, although the mobile device 120 is depicted in FIG. 1 as connecting to the vehicle 105 via the BLEM 195, it is possible and contemplated that the wireless connection 133 may also or alternatively be established between the mobile device 120 and one or more of the ECUs 117 via the respective transceiver(s) associated with the module(s).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality.

The DAT controller 199 may provide Level-1 through Level-3 automated driving and driver assistance functionality that can include, for example, active parking assistance, trailer backup assistance, adaptive cruise control, lane keeping, and/or driver status monitoring, among other features. The DAT controller 199 may also provide aspects of user and environmental inputs usable for user authentication. Authentication features may include, for example, biometric authentication and recognition.

The DAT controller 199 can obtain input information via the sensory system(s) 182, which may include sensors disposed on the vehicle interior and/or exterior (sensors not shown in FIG. 1). The DAT controller 199 may receive the sensor information associated with driver functions, vehicle functions, and environmental inputs, and other information. The DAT controller 199 may characterize the sensor information for identification of biometric markers stored in a secure biometric data vault (not shown in FIG. 1) onboard the vehicle 105 and/or via the server(s) 170.

In other aspects, the DAT controller 199 may also be configured and/or programmed to control Level-1 and/or Level-2 driver assistance when the vehicle 105 includes Level-1 or Level-2 autonomous vehicle driving features. The DAT controller 199 may connect with and/or include a Vehicle Perception System (VPS) 181, which may include internal and external sensory systems (collectively referred to as sensory systems 182). The sensory systems 182 may be configured and/or programmed to obtain sensor data usable for biometric authentication, and for performing driver assistance operations such as, for example, active parking, trailer backup assistance, adaptive cruise control and lane keeping, driver status monitoring, and/or other features.

The vehicle PaaK system (not shown in FIG. 1) determines and monitors a location for a PaaK-enabled mobile device relative to the vehicle location in order to time broadcasting a pre-authentication message to the mobile device 120, or other passive key device such as a fob 179. As the mobile device 120 approaches a predetermined communication range relative to the vehicle position, the mobile device may transmit a preliminary response message to the PaaK-enabled vehicle. The vehicle PaaK system may cache the preliminary response message until a user associated with the authenticating device performs an unlock action such as actuating a vehicle door latch/unlatch mechanism by pulling a door handle, for example. The PaaK system may unlock the door using data already sent to the pre-processor to perform a first level authentication without the delay associated with full authentication steps.

After actuation of the door latch, the PaaK system may perform post-authentication confirmation using a secure processor, by transmitting, to the requesting device, a validation message that includes a challenge value requiring a validation response from the requesting device, and authenticating responsive validation messages using the secure processor. Responsive messages that correctly answer the validation message may confirm authenticity of the requesting device, and no further mitigating action is taken.

The processor(s) 150 may provide initial access to the vehicle 105 when the mobile device 120 is within the passive-entry-passive-start (PEPS) zone. Determining that the mobile device 120 is proximate to the vehicle 105 and within the PEPS zone, in conjunction with one or more other triggers, may cause pre-authorization steps to begin. For example, the processor(s) 150 may generate a secure processor initialization instruction responsive to a door latch opening, or a user touching the sensory area of a door handle or keyless entry keypad, or presence detection through cameras, electromagnetic sensing, or other methods. The processor(s) 150 may receive a sensor output that indicates an attempt to enter the vehicle.

The handle touch, by itself, would not trigger an unlock instruction. Rather, in an example embodiment, the touch to the door handle, plus the proximity indication associated with the position of the mobile device 120 with respect to the vehicle 105, may cause a door handle sensor (not shown in FIG. 1) to transmit sensor output to the processor(s) 150. The processor(s) 150 may receive the vehicle sensor output associated with the actuation of the door handle (not shown in FIG. 1) (and more precisely, associated with an actuation of a door latch mechanism (not shown in FIG. 1) of the door handle, and generate a secure processor initialization instruction to the secure processor(s) 150 in response.

The processor(s) 150 may also provide access to the vehicle 105 in conjunction with the secure processor(s) 150 by unlocking the door 198 (not shown in FIG. 1), based on the key-on request generated and/or the authentication message (key-on request and authentication message not shown in FIG. 1) stored in the cache memory of the automotive computer 145. The secure processor initialization instruction may initialize the secure processor(s) 150, by sending instructions that "wake up" the secure processor(s) 150 by changing a power mode profile from a low-energy state to a higher-energy state. Once initialized, the secure processor(s) 150 may verify the authentication message stored in the cache memory of the automotive computer 145 before unlocking the door 198.

The computing system architecture of the automotive computer 145, VCU 165, and/or the ToF localization system 107 may omit certain computing modules. It should be readily understood that the computing environment depicted in FIG. 1 is an example of a possible implementation according to the present disclosure, and thus, it should not be considered limiting or exclusive.

The automotive computer 145 may connect with an infotainment system 110 that may provide an interface for the navigation and GPS receiver 188, and the ToF localization system 107. The infotainment system 110 may include voice recognition features, biometric identification capabilities that can identify users based on facial recognition, voice recognition, fingerprint identification, or other biological identification means. In other aspects, the infotainment system 110 may provide user identification using mobile device pairing techniques (e.g., connecting with the mobile device 120), a Personal Identification Number (PIN) code, a password, passphrase, or other identifying means.

Figure 2:
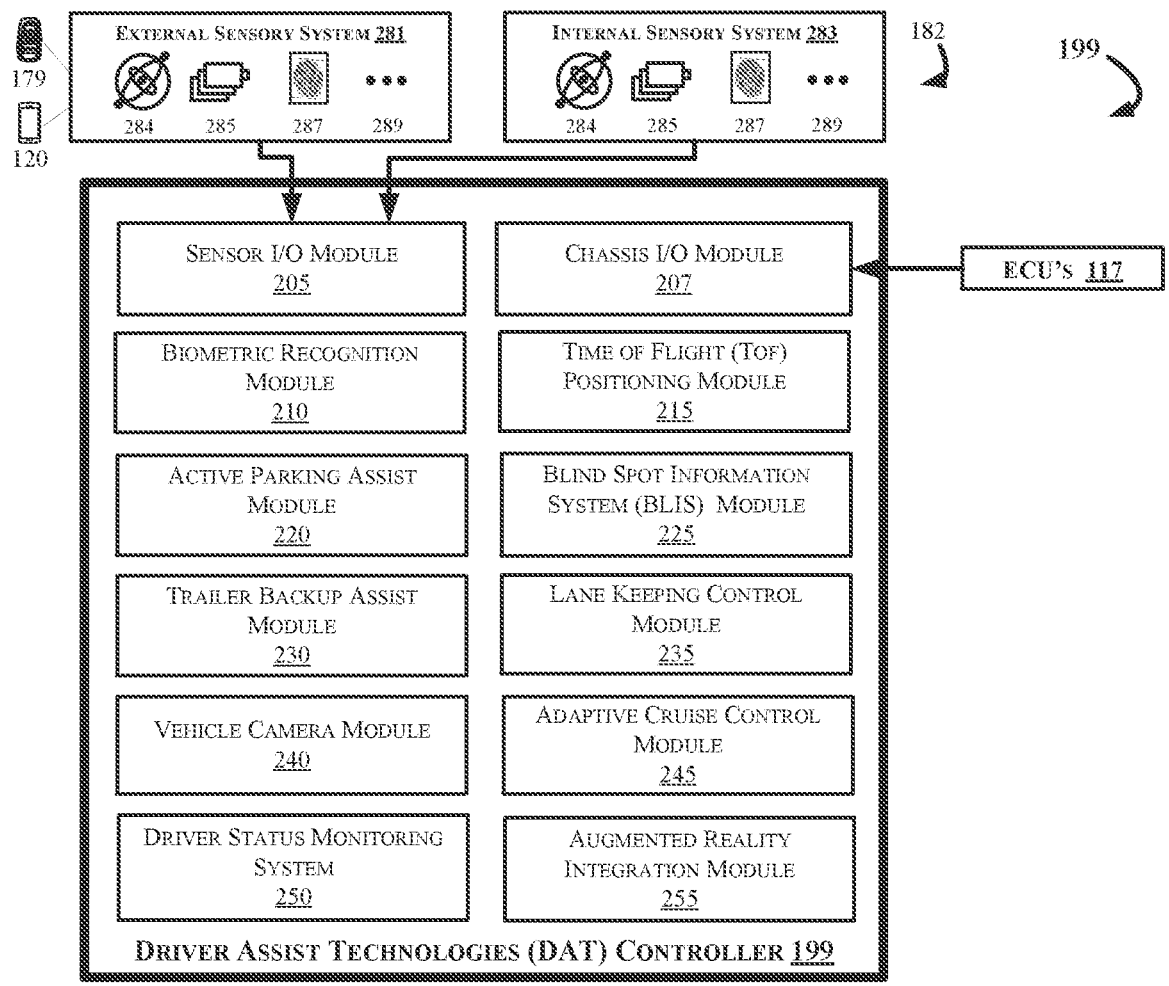
FIG. 2 depicts a functional schematic of a Driver Assist Technologies (DAT) controller in accordance with the present disclosure.

FIG. 2 depicts an example DAT controller 199, in accordance with an embodiment. As explained in prior figures, the DAT controller 199 may provide automated driving and driver assistance functionality and may provide aspects of user and environmental assistance. The DAT controller 199 may facilitate user authentication, such as biometric authentication that can include facial recognition, fingerprint recognition, voice recognition, gait recognition, and other unique and non-unique biometric aspects. The DAT controller 199 may further provide vehicle monitoring, and multimedia integration with driving assistances.

In one example embodiment, the DAT controller 199 may include a sensor I/O module 205, a chassis I/O module 207, a Biometric Recognition Module (BRM) 210, a ToF positioning module 215, an active parking assist module 220, a blind spot information system (BLIS) module 225, a trailer backup assist module 230, a lane keeping control module 235, a vehicle camera module 240, an adaptive cruise control module 245, a driver status monitoring system 250, and an augmented reality integration module 255, among other systems. It should be appreciated that the functional schematic depicted in FIG. 2 is provided as an overview of functional capabilities for the DAT controller 199 and should not be considered limiting. In some embodiments, the vehicle 105 may include more or fewer modules and control systems.

The DAT controller 199 can obtain input information via the sensory system(s) 182, which may include the external sensory system 281 and the internal sensory system 283 sensors disposed on the vehicle 105 interior and/or exterior, and via the chassis I/O module 207, which may be in communication with the ECUs 117. The DAT controller 199 may receive the sensor information associated with driver functions, and environmental inputs, and other information from the sensory system(s) 182.

In other aspects, the DAT controller 199 may also be configured and/or programmed to control Level-1 and/or Level-2 driver assistance when the vehicle 105 includes Level-1 or Level-2 autonomous vehicle driving features. The DAT controller 199 may connect with and/or include a Vehicle Perception System (VPS) 181, which may include internal and external sensory systems (collectively referred to as sensory systems 182). The sensory systems 182 may be configured and/or programmed to obtain sensor data usable for biometric authentication, and for performing driver assistance operations such as, for example, active parking, trailer backup assistance, adaptive cruise control and lane keeping, driver status monitoring, and/or other features.

The DAT controller 199 may be configured and/or programmed to provide biometric authentication control for the vehicle 105, including, for example, facial recognition, fingerprint recognition, voice recognition, and/or provide other authenticating information associated with characterization, identification, occupant appearance, occupant status, and/or verification for other human factors such as gait recognition, body heat signatures, eye tracking, etc. The DAT controller 199 may obtain the sensor information from an external sensory system 281, which may include sensors disposed on a vehicle exterior and in devices connectable with the vehicle 105 such as the mobile device 120 and/or the fob 179.

The DAT controller 199 may further connect with the sensory system 182, which can include an internal sensory system 283, and which may include any number of sensors configured in the vehicle interior (e.g., the vehicle cabin, which is not depicted in FIG. 2). The external sensory system 281 and internal sensory system 283 can connect with and/or include one or more inertial measurement units (IMUS) 284, camera sensor(s) 285, fingerprint sensor(s) 287, and/or other sensor(s) 289, and obtain biometric data usable for characterization of the sensor information for identification of biometric markers stored in a secure biometric data vault (not shown in FIG. 2) onboard the vehicle 105, and to obtain environmental data for providing driver assistance features. The DAT controller 199 may obtain, from the external and internal sensory systems 281 and 283, sensory data that can include external sensor response signal(s) and internal sensor response signal(s) (collectively referred to as sensory data), via the sensor I/O module 205. The DAT controller 199 (and more particularly, the biometric recognition module 210) may characterize the sensory data, and generate occupant appearance and status information to an occupant manager, which may use the sensory data according to described embodiments.

The internal and external sensory systems 283 and 281 may provide the sensory data obtained from the external sensory system 281 and the sensory data from the internal sensory system. The sensory data may include information from any of the sensors 284-289, where the external sensor request message and/or the internal sensor request message can include the sensor modality with which the respective sensor system(s) are to obtain the sensory data.

The camera sensor(s) 285 may include thermal cameras, RGB (Red Green Blue) cameras, NIR (Near Infrared) cameras and/or a hybrid camera having thermal, RGB, NIR, or other sensing capabilities. Thermal cameras may provide thermal information of objects within a frame of view of the camera(s), including, for example, a heat map figure of a subject in the camera frame. A standard camera may provide color and/or black-and-white image data of the target(s) within the camera frame. The camera sensor(s) 285 may further include static imaging, or provide a series of sampled data (e.g., a camera feed) to the biometric recognition module 210.

The IMU(s) 284 may include a gyroscope, an accelerometer, a magnetometer, or other inertial measurement devices. The fingerprint sensor(s) 287 can include any number of sensor devices configured and/or programmed to obtain fingerprint information. The fingerprint sensor(s) 287 and/or the IMU(s) 284 may also be integrated with and/or communicate with a passive key device, such as, for example, the mobile device 120 and/or the fob 179. The fingerprint sensor(s) 287 and/or the IMU(s) 284 may also (or alternatively) be disposed on a vehicle exterior space such as the engine compartment (not shown in FIG. 2), door panel (not shown in FIG. 2), etc. In other aspects, when included with the internal sensory system 283, the IMU(s) 284 may be integrated in one or more modules disposed within the vehicle cabin or on another interior surface of the vehicle.

Figure 3:
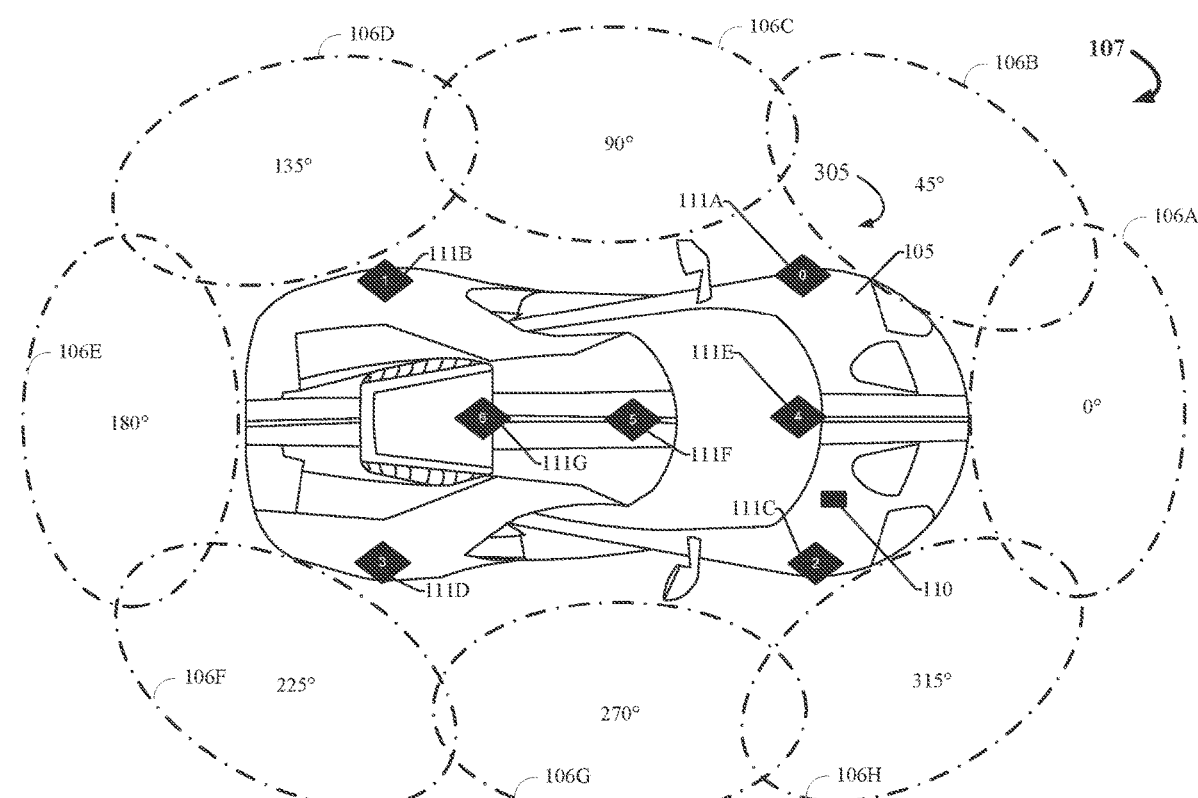
FIG. 3 illustrates an example automotive computer disposed in communication with a multiple input multiple output (MIMO) antenna array in accordance with the present disclosure.

FIG. 3 illustrates the vehicle 105 disposed with the automotive computer 145 (not shown in FIG. 3). The automotive communication is operatively connected with and in communication with an antenna array 305, which may include, for example, a plurality of Time-of-Flight (ToF) modules 111, which may include Tags (ToF modules) 111A, 111B, 111C, 111D, 111E, 111F, and 111G. The ToF modules are illustrated in FIG. 3 as diamonds numbered 0-6 disposed at various locations on the vehicle 105, in accordance with the present disclosure.

To categorize the position of the user 140 (not shown in FIG. 3) when localization occurs, eight vehicle regions 106 may be defined. The vehicle regions 106 are depicted as dashed ovals surrounding the vehicle 105, including vehicle regions 106A, 106B, 106C, 106D, 106E, 106F, 106G and 106H. These eight regions come from the 360° coverage associated with seven ToF modules 111 as illustrated by region numbers demarcated as numbered diamonds. The ToF modules 111 may provide vehicle surrounding location coverage in each of the respective vehicle regions 106 (e.g., 0°, 45°, etc.). Accordingly, each region covers approximately 45° of coverage.

When using conventional localization methods based on signal amplitude, (i.e., of BLE, ToF, UHF, etc.) signal interference that results in absorption, reflection or loss of a signal will cause inconsistencies when determining the position and/or distance of a ToF capable Smartphone or other device (i.e. a ToF capable watch, a Key Fob such as the fob 179 as shown in FIG. 1, or mobile device 120 which may be, for example, a smartphone, a tablet, or another such device) relative to the vehicle 105, thus preventing robust performance of the PaaK to execute required operations such as lock, unlock, or PEPS. This is due to such absorption or reflection altering the expected signal amplitude of a signal for a known distance of a transmitter from a receiver and, in part, due to conventional systems utilizing a single module and/or antenna to localize the ToF device thus depending on only one measurement of amplitude versus multiple measurements.

Conventional user approach and localization methods based on the angle (position) around a vehicle, using angle of arrival by communicating with a single module and multiple antennas, can provide better performance than amplitude-based approaches. However, in scenarios where the line of sight is not consistently available, the angle of arrival approach is also problematic for conventional localization systems using BLE, ToF, or UHF angle of arrival. The above described shortcomings with both amplitude and/or angular based measurement of arriving signals can be avoided by measuring the time of propagation for the signal since time of propagation is not affected by absorption and line-of sight received versus reflected (multi-path) received signals since they can be identified by their relative time markers.

According to an embodiment of the present disclosure, the ToF localization system 107 may utilize the ToF modules 111 to determine the angle at which a ToF device approaches the vehicle 105 using ToF. The ToF localization system 107 may detect and measure ToF using, at least in part, a combination of the ToF modules 111 to accurately localize a ToF device (e.g., the mobile device 120 or the fob 179, as shown in FIG. 1) for 360° of coverage around the vehicle 105.

The ToF localization system 107 may determine a region around the vehicle 105 where a user (not shown in FIG. 3 or 4) may be standing or approaching. Example use case scenarios can include, for example, line of sight in an empty parking lot, non-line of sight in an empty parking lot, line of sight in a crowded parking lot, non-line of sight in a crowded parking lot, line of sight in a garage, and non-line of sight in a garage. Other scenarios are possible and such scenarios are contemplated.

Figure 4:
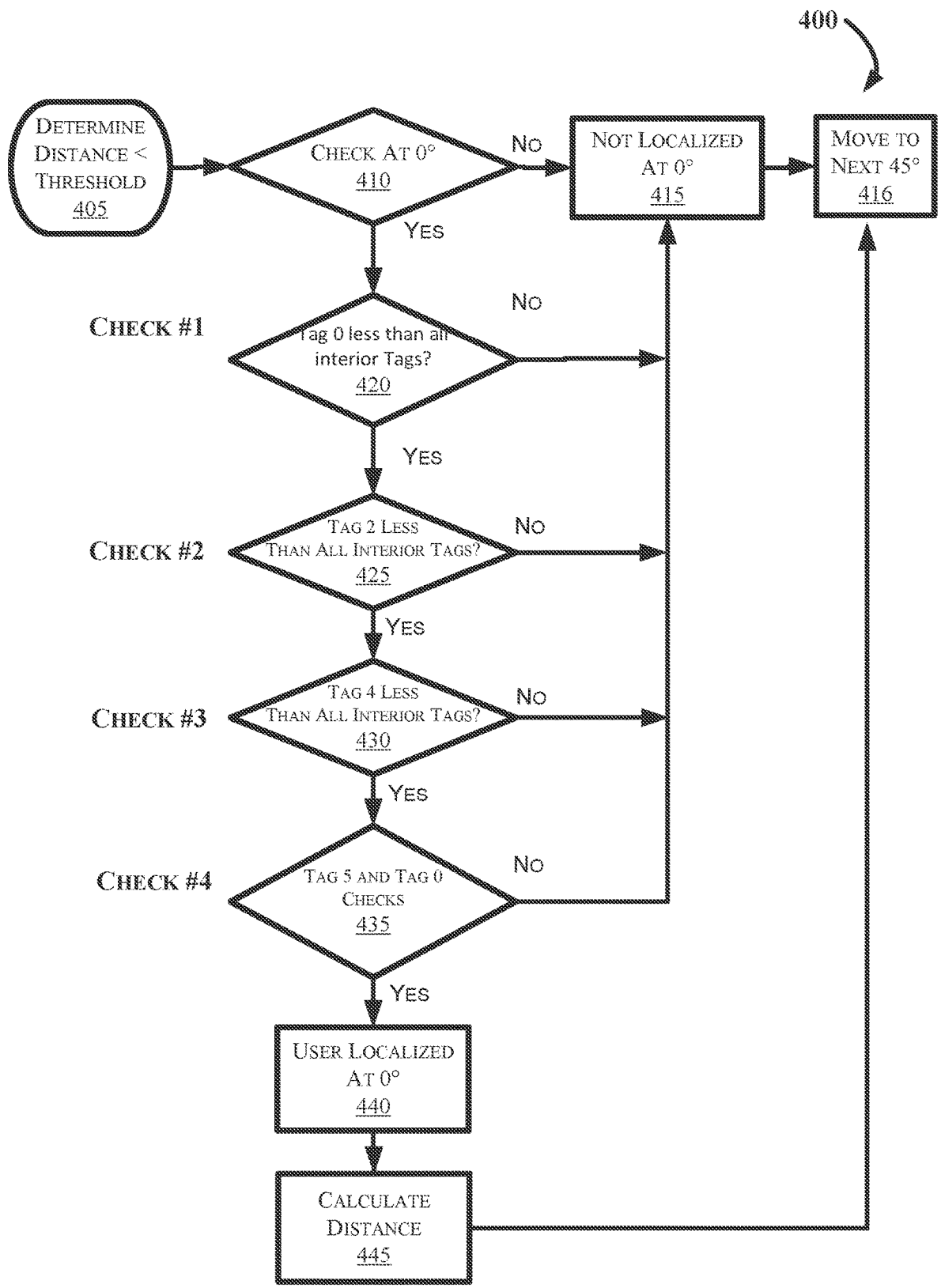
FIG. 4 depicts a flow diagram of localizing a user device using ToF technology in accordance with the present disclosure.

FIG. 4 depicts a flow diagram illustrating localizing a user device using ToF according to these various use case scenarios, in accordance with the present disclosure. FIGS. 3 and 4 will be considered together in the following section.

The location strategy can be initiated in many different ways. Initiation means that the process of localizing the mobile device 120 via PaaK to enable passive features has begun. Therefore, when the user device is actuated via a button or screen actuation, or when the user 140 presses/places a hand to a vehicle handle (not shown in FIG. 3 or 4), the chassis I/O module 207 may cause one or more vehicle doors to be unlocked.

The ToF localization system 107 may begin initialization at step 405 in various ways. For example, in one aspect, the ToF localization system may actuate upon user 140/mobile device 120 approach when the ToF localization system 107 causes the localization algorithm to determine that the approaching user is 2 meters or less from the skin of the vehicle 105. This method consumes the most power by both the vehicle 105 and the smartphone or other mobile device 120, as the vehicle 105 and mobile device 120 are (in most cases) in constant communication, and the vehicle 105 is localizing all or substantially all of the time.

In another aspect, the initialization step 405 commences when the mobile device 120/vehicle 105 can successfully receive and interpret a signal from all seven of the ToF modules 111 (e.g., when all the ToF modules 111 are able to send packets to and receive packets from the mobile device 120).

In another embodiment, the initialization step 405 begins when all of the ToF modules 111 report a distance to mobile device value to the automotive computer 145, and the maximum distance measurement from all the modules is less than 7.3 meters.

In yet another embodiment, the initialization step 405 commences when the user presses/places a hand to the handle of the vehicle 105 (which is the traditional and possibly the slowest method for the user 140 to trigger a passive entry).

Using the previously mentioned handle touch test method, the ToF localization system 107 is able to determine a vehicle region of the plurality of vehicle regions 108 in which the mobile device 120 or other ToF device (e.g., the fob 179, etc.) is localized, as well as calculate the distance between the mobile device 120 or other ToF device and the vehicle 105. The ToF localization system 107 performs this check regardless of the distance of the user 140/mobile device 120 from the vehicle 105. The first part of the algorithm (similar to a conventional operation PEPS localization) is initiated to determine if Passive features should be made available to provide vehicle access. Determining the user's 140 position and distance with respect to the vehicle 105 is still useful for continuous localizing, even when the user is more than 2 meters from the vehicle 105. The procedure shown in FIG. 4 describes the disclosed localization method when a user location is determined to be 2 meters and under from the vehicle. Another procedure is described with respect to FIG. 5 for device localization using ToF when the user 140/device 120 is determined to be a distance greater than 2 meters from the skin of the vehicle 105.

At step 405, the ToF localization system 107 may determine if the mobile device 120 is less than a predetermined threshold distance from the vehicle 105. For example, in one embodiment, the ToF localization system 107 determines if the mobile device 120, which can serve as an anchor point, is located more or less than 2 meters from the vehicle 105.

At step 410 the ToF localization system 107 determines the distance from the anchor point (mobile device 120) to all seven of the ToF modules 111. Responsive to a negative determination, at step 415, the ToF localization system 107 may determine that the mobile device 120 is not localized at 0°, and advance to assessing localization at a second module location at 45° (step 416). It should be appreciated that the step 416 represents the entire algorithm of Checks 1, 2, 3, and 4 but at the 45° module instead of at 0°, then at 90° instead of 45°, etc., throughout the entire periphery of the vehicle 105.

At step 420 the ToF localization system 107, responsive to an affirmative localization determination at step 410, may perform a first check (Check #1) to determine whether the mobile device 120 distance to Tag 0 111A is less than the user's distance to all interior Tags 111E-111G. Responsive to an affirmative determination, the ToF localization system 107 proceeds from step 420 to Check #2. Responsive to a negative determination at step 420, the system returns to step 415, where the ToF localization system 107 may determine that the mobile device 120 is not localized at the present position (currently at 0° 106A), and then proceeds to a round of checking at a second location at 45° (step 416). It should be appreciated that the step 416 represents the entire algorithm of Checks 1, 2, 3, and 4 but rather at a next position at 45° instead of at 0°, then at 90° instead of 45°, etc., throughout the entire periphery of the vehicle 105.

At step 425 the ToF localization system 107 performs a second check (Check #2), to determine whether the mobile device 120 distance to Tag 2 111C is less than the user's distance to all interior Tags 111E-111G. Responsive to a positive determination, the process proceeds to Check #3. Responsive to a negative determination at step 425, the ToF localization system 107 may determine that the mobile device 120 is not localized at the present position (currently at 0° 106A), and moves to a round of checking at a second location at 45° (step 416).

At step 430 the ToF localization system 107 performs a third check (Check #3) and determines whether the mobile device 120 distance to Tag 4 111E is less than the user's distance to the other two interior Tags 111F and 111G. Responsive to a positive determination, the process proceeds to Check #4. Responsive to a negative determination, at step 436, the ToF localization system 107 may determine that the mobile device 120 is not localized at the present position (currently at 0° 106A), and moves to a round of checking at a second location at 45° (step 416).

At step 435 the ToF localization system 107 performs a fourth check (Check #4) and determines whether the mobile device 120 distance to Tag 5 111F is less than the user's distance to Tag 6 111G, AND the mobile device 120 is less than a predetermined distance (e.g., 1.5 meters, 1.8 meters, etc.) to Tag 0 111A. Responsive to a negative determination, at step 435, the ToF localization system 107 may determine that the mobile device 120 is not localized at the present position (currently at 0° 106A), and moves to a round of checking at a second location at 45° (step 416).

At step 440 the ToF localization system 107 determines that the mobile device 120 is at the front of the vehicle (e.g., 106A), and proceeds to performance of a distance calculation at step 445.

Using the logic conditions from the procedure above ensures that the mobile device 120 is in one of the eight specified regions 106A-106H with a relatively higher confidence than if fewer conditions were used. Successfully determining the location of the user device (e.g., the mobile device 120) and thus, the user 140, also guarantees that the final part of the algorithm runs correctly to determine the distance the user 140 is from the vehicle 105. Using the closest tags to the specific region, and comparing distances to the other tags over the four checks (Check 1 through Check 4) helps maintain accuracy and precision in locating the user 140 using ToF.

In the case that the ToF device (e.g., the mobile device 120) is not in the 0° region 106A, the logic and flowchart to check if the device is at the 45° vehicle region 106B, 90° vehicle region 106C, or any of the other positions around the vehicle (e.g., 106D-106H), the logic and flowchart use the same approach. The mobile device 120 distances to various tags are measured and compared to the distance from the closest Tags to the particular region that is being checked. For example, if the device 120 is being checked at the 45° region 106B, distances to other Tags are compared to Tags 0 111A, 1 111B, 4 111E, & 5 111F. If the device 120 is being checked at the 225° region 106F, distances to other Tags are compared to Tags 2 111C, 3 111D, 5 111F, & 6 111G.

Figure 5:
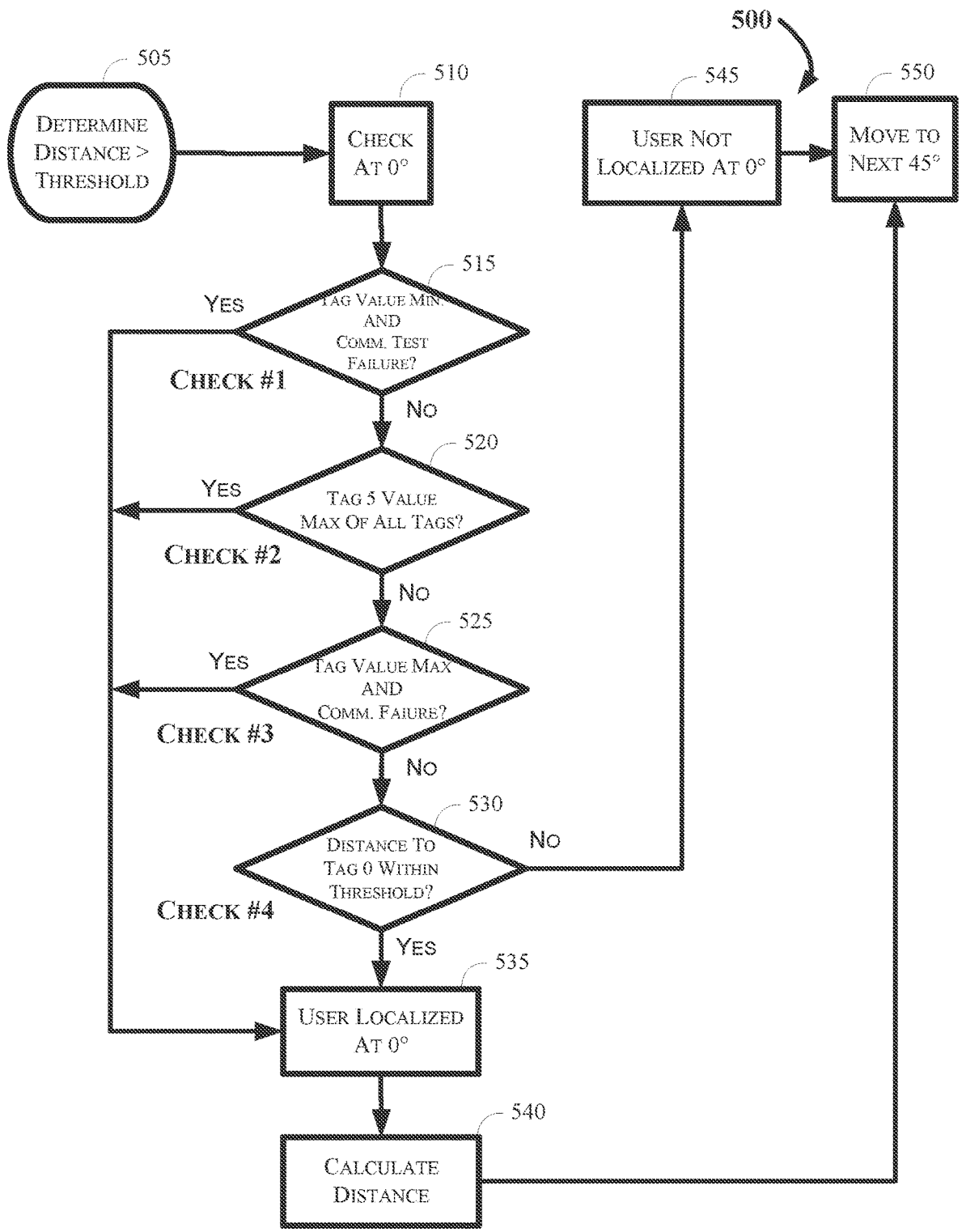
FIG. 5 depicts another flow diagram of localizing a user device using ToF in accordance with the present disclosure.

FIG. 5 depicts another flow diagram of localizing a user device using ToF when the user device is determined to be over 2 meters from the vehicle 105 in accordance with the present disclosure.

These four checks rely on Tags 0 111A, 1 111B, 2 111C, 3 111D, 5 111F, & 6 111G. If one of the four checks (e.g., Checks #1-4 as shown in FIG. 5) pass, the mobile device 120 (and thus, the user 140) is determined to be at the 0° vehicle region 106A. If all of the four checks fail, the mobile device 120 is determined not to be at the 0° vehicle region 106A. The algorithm then moves on to check if the user is at the next subsequent region, (e.g., the 45° region 106B, etc.) until all the vehicle regions 106 are checked.

At step 505 the ToF localization system 107 may determine if the mobile device 120 is greater than a predetermined threshold distance from the vehicle 105. One example threshold distance is 2 meters. In another embodiment, the threshold distance may be 2.5 meters, 3 meters, etc. In one embodiment, starting at the 0° vehicle region 106A, the ToF localization system 107 determines whether the mobile device 120 is located more or less than 2 meters from the vehicle 105.

Responsive to determining that the mobile device 120 is more than 2 meters from the vehicle 105, the ToF localization system 107 proceeds to step 510, to check the mobile device 120 position at region 0° 106A with respect to the vehicle 105. Accordingly, the ToF localization system 107 performs a first check (e.g., Check 1) to determine the distance from an anchor point (e.g., the mobile device 120) to all seven of the ToF modules 111.

At the first check (Check #1) at step 515, if the mobile device 120 distance to Tag 0 111A is less than the user device's distance to all interior Tags 111E, 111F, and 111G, AND the user device distance to Tag 2 111C is less than the user device distance to all of the interior Tags 111E, 111F, and 111G, AND the user device distance to the Tag 6 111G is less than 7 meters, AND the Tag 1 111B and the Tag 3 111D fail to communicate with the user's ToF device 120, then the user is located at the front of the vehicle 105 (e.g., the vehicle region 106A). Responsive to determining that the mobile device 120 is not at the front of the vehicle in vehicle region 106A, then the ToF localization system 107 proceeds to the next step.

At the second check (Check #2) at step 520, the ToF localization system 107 determines if the Tag 5 111F value is the maximum value of all the values associated with the tags 111. Responsive to an affirmative determination, the ToF localization system 107 determines that the user 140 is positioned at the front of the vehicle (e.g., the vehicle region 106A). Responsive to a negative determination, the ToF localization system 107 proceeds to the third check.

At the third check (Check #3) at step 525, if the mobile device 120 distance to Tag 6 111G is greater than the user device's 120 distance to all of the other tags 111A-111F, AND Tag 1 111B and Tag 3 111D have failed to communicate with the mobile device 120, then the ToF localization system 107 determines that the user 140 is positioned at the front of the vehicle (e.g., the vehicle regions 106A). Responsive to a negative determination (e.g., there was communication at one of the tested Tag locations), then the system proceeds to block 530 which is fourth check (check #4). Responsive to a positive determination, the ToF localization system 107 proceeds to block 535.

At block 530 the ToF localization system 107 performs the fourth check (Check #4), to determine whether the distance to the Tag 0 111A is greater than a predetermined threshold distance (e.g., 11 m, 10.5 m, 10 m, etc.). Responsive to a positive determination, the ToF localization system 107 determines that the mobile device 140 is localized at 0° (step 535). Responsive to a negative determination, the ToF localization system determines that the user is not localized at 0° at step 545. The system may then move to the next 45° position as shown at block 550.

Again, multiple conditions confirm the mobile device 120 location at a higher level of confidence than if fewer conditions were used. Correctly determining the vehicle region 106 in which the mobile device 120 is localized may confirm that the final portion of the algorithm runs properly when determining the distance, the user 140 is from the vehicle 105. Similar to the short-range localization, the long-range localization uses tags that are closest to the specific vehicle region 106 being evaluated for localization, and compares them to the distances to other tags. In addition, a few other logic checks are in place, in the case one of the previous conditions fails. The long-range process runs through all eight regions each time to maintain accuracy and precision.

FIG. 6 is a table of tag distances at 0° with respect to the MIMO antenna array (e.g., the ToF modules 111) in accordance with the present disclosure. The table of FIG. 6 depicts data for longer distances (e.g., 2 m, 3 m, 4 m, etc.). There are four OR checks performed to determine if the user of an ToF device is at the 0° (front of the vehicle) region 106A. FIG. 7 is a table of measurement tag distances at 0° with respect to the MIMO antenna array (e.g., the ToF modules 111) in accordance with the present disclosure. The table of FIG. 7 depicts data for shorter distances (e.g., 1 ft, 1 m, etc.).

The tables depicted in FIG. 6 and FIG. 7 include data collected during testing at different distances to the vehicle 105. There are some differences between short and long range. At close distances, all seven tags 111 may communicate with the ToF anchor (e.g., the mobile device 120). At long distances, this may not be the case. Due to these differences, the logic checks may be advantageously differentiated from one another to confirm the user's 140 position. This is also the reason that the first part of the algorithm includes performance of a check to determine if the mobile device 120 is over or under two meters from the vehicle 105. Regardless of distance, the ToF localization system 107 accurately reports the distance from anchor (e.g., the mobile device 120) to Tag 111, and the change in testing distance is in the results.

Figure 8:
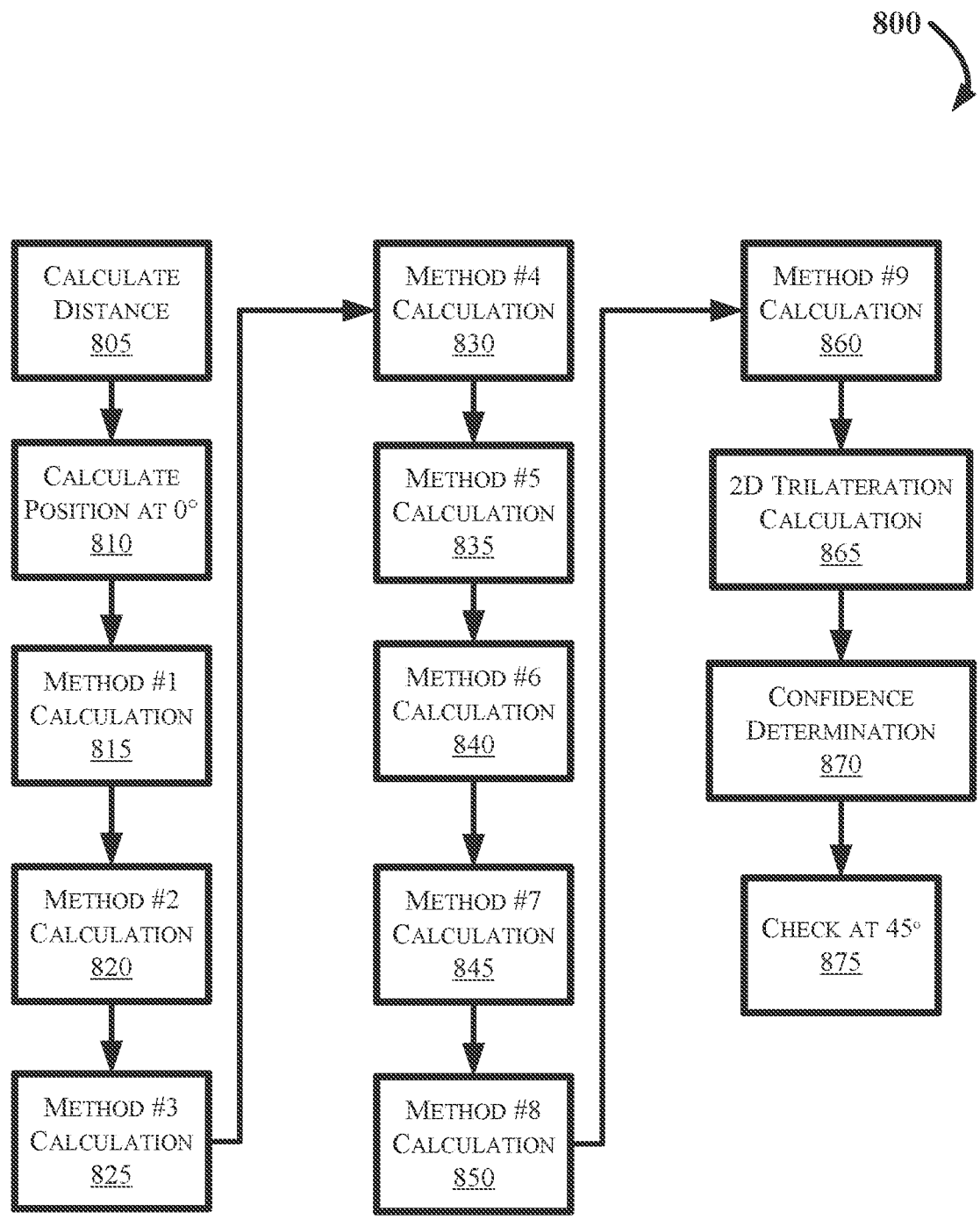
FIG. 8 depicts another functional flow diagram of localizing a user using ToF in accordance with the present disclosure.
Figure 9A:
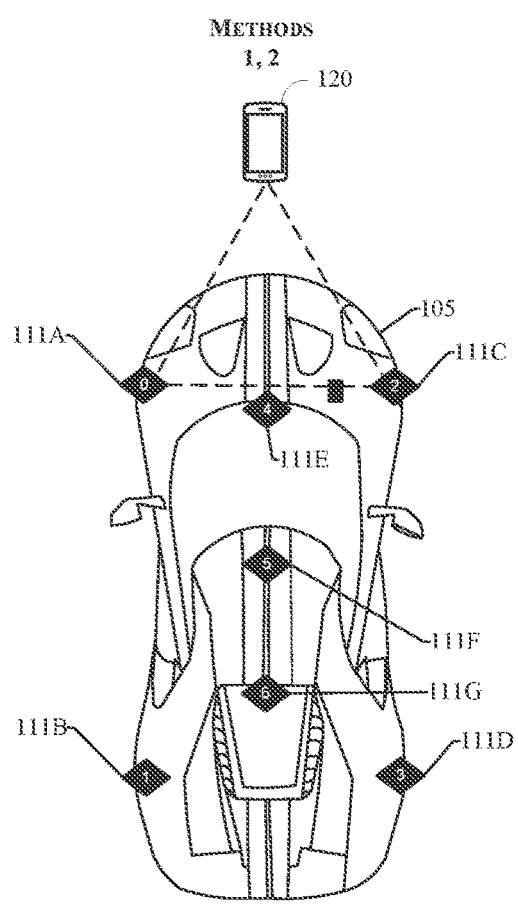
FIGS. 9A and 9B depict localization of a mobile device using trilateration in accordance with the present disclosure.
Figure 9B:
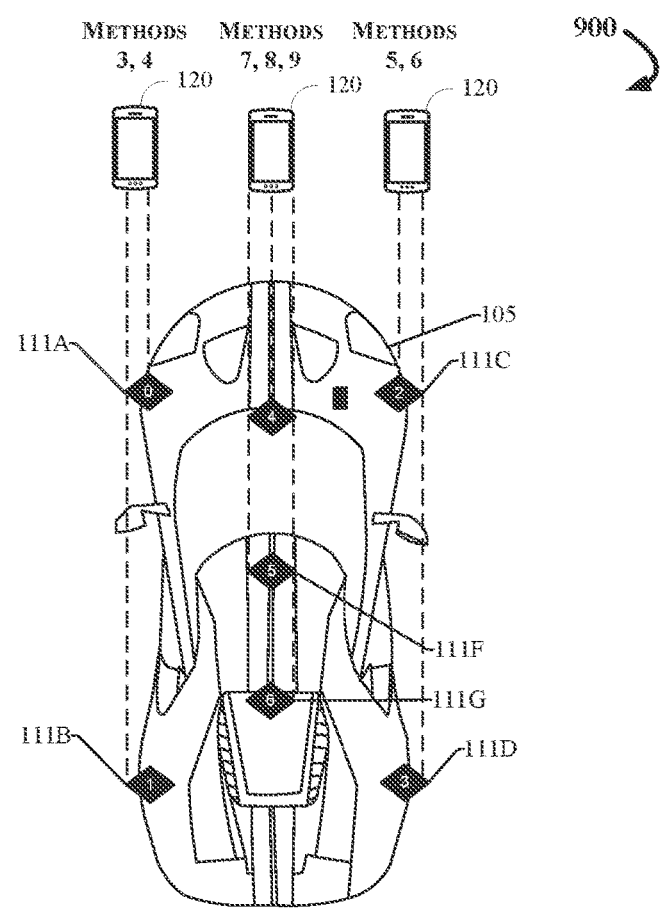

FIG. 8 illustrates a flow diagram 800 showing the steps the algorithm takes to calculate the mobile device 120 distance to the vehicle 105, according to another embodiment. FIGS. 9A and 9B depict localization of the mobile device 120 using three methods of trilateration, in accordance with the present disclosure. FIG. 8 and FIG. 9 are considered together in the following section.

With reference now to FIG. 8, at step 805, the ToF localization system 107 may determine a particular region proximate to the vehicle 105 in which the ToF device (e.g., the mobile device 120) is localized, as well as calculate the distance the smartphone or other ToF device is from the vehicle 105. This is done regardless of being over or under two meters from the skin of the vehicle 105. Even when determined to be over two meters, the ToF localization system 107 can still track the approach of the user device by repeating the localization algorithm. The distance calculations are the same, regardless if the user 140 is determined to be over or under two meters. There are three different types of calculation methods. One uses direct distance measurements to the tags. The second creates right triangles based on the tag position as well as different distances, inherent to the vehicle itself such as width. The third method uses a 2D Trilateration method to calculate distance. Note that when the user is determined to be over 2 meters from the vehicle, 2D trilateration calculations are not computed, due to possible failure to communicate with some tags. After all calculations are complete, a confidence percentile is determined based on the how many of the total calculations are within a predetermined range.

At step 810 the ToF localization system 107 determines a position of the mobile device 120 at position 0° 106A (as depicted in FIG. 3). At steps 815, 820, 825, 830, 835, 840, 845, 850, and 860, the ToF localization system 107 performs a series of calculations, then performs at step 865 a series of trilateration calculations (represented in FIG. 8 as step 865 and described in detail with respect to FIG. 9), performs a confidence determination step at Step 870, and finally reiterates the process at subsequent 45° intervals at step 875.

With reference now to FIGS. 9A and 9B, Methods 1-9 are described pictorially, where FIG. 9A illustrates trilateration using Methods #1 and #2, and FIG. 9B illustrates trilateration using Methods #3-9.

Method #1 and Method #2 take direct measurements from Tag 0 111A and Tag 2 111C (as shown in FIG. 3), respectively. Using a known half width of the vehicle 105 to create a right triangle, and the Pythagorean Theorem, a distance is calculated for the mobile device 120 from the vehicle 105. This distance is adjusted by subtracting the physical distance of where Tag 0 111A and Tag 2 111C are positioned, from the front of the vehicle 105 for Method 1 and 2, respectively.

For example, if Tag 0 111A measures the user to be 3.3 meters from the skin of the vehicle 105, this is classified as variable 'C'. If the known half width of the vehicle 105 is 0.9 meters, this is classified as variable 'A'. By Pythagorean Theorem for right triangles, $A^2+B^2=C^2$. Rearranging this to get the unknown side $B=\sqrt{(C^2-A^2)}$. The algorithm may then take the difference between B and the distance from the front of the vehicle 105 to Tag 0 111A. If this value is 1 m then the user 140 is calculated to be $\sqrt{(3.3^2-0.9^2)}-1=2.1$ m from the vehicle 105, according to Method #1. The same approach may also be utilized to perform Method #2.

Method #'s 3-9 may include calculation of the user's 140 (and more precisely, distance of the mobile device 120) from the vehicle 105 in the same way. Method 3, 4, 5, 6, 7, 8, and 9 may take direct measurements to Tags 0 111A, 1 111B, 2 111C, 3 11D, 4 111E, 5 111F, and 6 111G, respectively.

The ToF localization system 107 may next take a difference from the measured distance and the physical distance of where Tags 0-6 (111A-111G) are from the front of the vehicle 105. For example, if Tag 4 111E measures a distance to the mobile device 120 to be 2.4 meters from the skin of the vehicle 105, and Tag 4 111E is 1.8 meters inward from the front of the vehicle 105, then the mobile device 120 is calculated to be 4.1−1.8=2.3 m from the vehicle 105.

Figure 10:
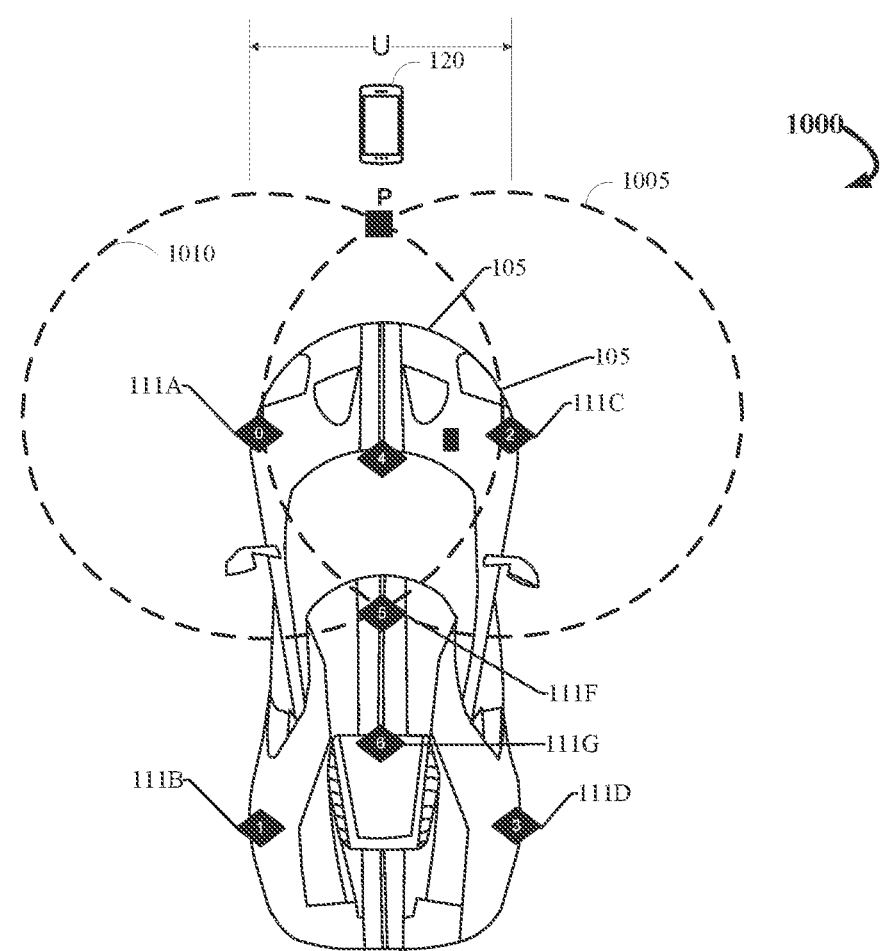
FIG. 10 depicts localization of a mobile device using trilateration in accordance with the present disclosure.

FIG. 10 depicts localization of the mobile device 120 using trilateration, in accordance with the present disclosure. The last calculation is a 2D Trilateration calculation. This calculation method uses two Cartesian dimensions, analytical geometry and a station-based coordinate frame.

The 2D Trilateration calculation uses two tags on the vehicle 105. These two tags act as the two circle centers (C1 1005 and C2 1010). For the 0° vehicle region 106A (as depicted in FIG. 3), let C1 1005 be Tag 0 and C2 be Tag 2. These two circles have a known separation U. Let U be the known distance between Tag 0 111A and Tag 2 111C. In this case, U is the full width of the vehicle 105. Where these two circles 1005 and 1010 intersect is point P, which may be an (x, y) coordinate relative to the (0, 0) coordinate frame of the center of C1. The radii of the two circles are defined as:

$$r_1^2 = x^2 + y^2$$

$$r_2^2 = (U-x)^2 + y^2$$

They can be rearranged to the following form:

$$x = \frac{r_1^2 - r_2^2 + U^2}{2U}$$

$$y = \pm\sqrt{r_1^2 - x^{\wedge}2}$$

This (x, y) coordinate pair represents the position of the mobile device 120 based on the trilateration calculation. The y coordinate represents the distance from the vehicle 105. The difference of the y value and the physical distance Tag 0 111A and Tag 2 111C are from the front of the vehicle 105 is taken to get the final distance the mobile device 120 is from the vehicle 105.

For example, if the half width of the vehicle 105 is 0.9652 m and the user's distance is determined to be 2.1 m, then the 2D coordinate pair is (0.9652, 2.1). The distance from the front of the vehicle 105 to Tag 0 111A and Tag 2 111C is 1.016 m. Using they coordinate point, the user is 2.1−1.016=1.084 m from the vehicle 105.

The result is based on 10 total calculations once the user (e.g., the mobile device 120) has been determined to be at the region 0° vehicle region 106A (depicted in FIG. 3).

With reference again to FIG. 8, at step 870, the ToF localization system 107 determines a confidence percentile based on all 10 results. The majority of the calculations that fall into a specified range may result in a distance from the vehicle 105 from which the user is located. For example, if 8 out of 10 of the 10 results evaluate within the range of 1.75-2.75, then the user 140 is determined to be 2 m from the vehicle 105 with an 80% confidence metric.

In addition to the calculations performed for the specific vehicle region 106 (as shown in FIG. 3) the location in which user 140 is positioned, the ToF localization system 107 may evaluate results for both neighboring regions to assure a distance from the vehicle 105 is relatively accurate to a particular region localized by Part 3. For example, if Part 3 determined the user 140 is localized in the 0° vehicle region 106A, the ToF localization system 107 may execute all calculation methods for the 45° vehicle region 106B and the 315° vehicle region 106H (see FIG. 3). These neighboring regions to the region—106A may also be included in the percent confidence calculation.

The calculation methods for the other 7 regions 106B-106H around the vehicle 105 are the same. A combination of direct measurements to the Tags 111, creating triangles based on known dimensions on the vehicle 105 and tag locations, and 2D trilateration. The ToF localization system 107 may calculate percent intervals at all eight regions around the vehicle 105 and at all distances, regardless of whether the ToF device (mobile device 140) is over or under 2 meters form the skin of the vehicle 105.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for localizing a user device using a Time-of-Flight (ToF) antenna array disposed on a vehicle, the method comprising:
   determining, via a ToF localization controller, that the user device is less than a threshold distance from the vehicle;
   determining an angle of arrival via the ToF localization controller and all of the antennas in the ToF antenna array comprising a plurality of ToF modules, wherein the plurality of ToF modules provides location coverage in each of a plurality of regions surrounding the vehicle, such that the ToF antenna array provides 360° coverage surrounding the vehicle, and wherein determining the angle of arrival comprises:
      performing a first ToF check for a signal received at a first vehicle exterior antenna of the ToF antenna array;
      performing a second ToF check for the signal received at a second vehicle exterior antenna of the ToF antenna array;
      performing a third ToF check for the signal received at a third vehicle exterior antenna of the ToF antenna array;
      performing a fourth ToF check at a plurality of vehicle interior antennae of the ToF antenna array; and
      determining that the user device is localized with a first region external to the vehicle using the first ToF check, the second ToF check, the third ToF check, and the fourth ToF check; and
   generating an unlock signal that unlocks a vehicle door responsive to determining that the user device is less than the threshold distance from the vehicle door.

2. The method according to claim 1, wherein determining the angle of arrival further comprises:
   determining, based on the ToF antenna array, that the user device is localized at a 0° position with respect to a front portion of the vehicle;
   measuring a distance from a vehicle portion to the user device, the measuring based on a signal ToF value; and
   determining, based on the distance, that the user device is less than the threshold distance from the vehicle door.

3. The method according to claim 1, wherein performing the first ToF check comprises:
   receiving, via the first vehicle exterior antenna, a first signal from the user device, the first signal comprising:
      a first ToF value indicative of a first ToF from a first interior antenna to the user device, and
      a second ToF value indicative of a second ToF from a second interior antenna to the user device; and
   determining, via the ToF localization controller, that the first ToF value is less than the second ToF value.

4. The method according to claim 1, wherein determining that the user device is less than the threshold distance comprises:
   receiving a ToF signal from a plurality of ToF antennae associated with the ToF antenna array; and
   determining, based on the ToF signal, that the user device is less than the threshold distance from a vehicle portion.

5. The method according to claim 4, wherein the threshold distance is 2 meters.

6. The method according to claim 4, wherein the vehicle portion is a driver side door handle.

7. A system, comprising:
a processor; and
a memory for storing executable instructions, the processor programmed to execute the instructions to:
determine, via a Time-of-Flight (ToF) localization controller, that a user device is less than a threshold distance from a vehicle;
determine an angle of arrival via the ToF localization controller and all antennas in a ToF antenna array comprising a plurality of ToF modules, wherein the plurality of ToF modules provides location coverage in each of a plurality of regions surrounding the vehicle, such that the ToF antenna array provides 360° coverage surrounding the vehicle, and wherein determining the angle of arrival comprises:
performing a first ToF check for a signal received at a first vehicle exterior antenna of the ToF antenna array;
performing a second ToF check for the signal received at a second vehicle exterior antenna of the ToF antenna array;
performing a third ToF check for the signal received at a third vehicle exterior antenna of the ToF antenna array;
performing a fourth ToF check at a plurality of vehicle interior antennae of the ToF antenna array; and
determining that the user device is localized with a first region external to the vehicle using the first ToF check, the second ToF check, the third ToF check, and the fourth ToF check; and
generate an unlock signal that unlocks a vehicle door responsive to determining that the user device is less than the threshold distance from the vehicle door.

8. The system according to claim 7, wherein the processor is further programmed to determine the angle of arrival by executing the instructions to:
determine, based on the ToF antenna array, that the user device is localized at a 0° position with respect to a front portion of the vehicle;
measure a distance from a vehicle portion to the user device based on a signal ToF value; and
determine, based on the distance, that the user device is less than the threshold distance from the vehicle door.

9. The system according to claim 7, wherein the processor is further programmed to perform the first ToF check by executing the instructions to:
receive, via the first vehicle exterior antenna, a first signal from the user device, the first signal comprising:
a first ToF value indicative of a first ToF from a first interior antenna to the user device, and
a second ToF value indicative of a second ToF from a second interior antenna to the user device; and
determine, via the ToF localization controller, that the first ToF value is less than the second ToF value.

10. The system according to claim 7, wherein the processor is further programmed to determine that the user device is less than the threshold distance by executing the instructions to:
receive a ToF signal from a plurality of ToF antennae associated with the ToF antenna array; and
determine, based on the ToF signal, that the user device is less than the threshold distance from the vehicle portion.

11. The system according to claim 10, wherein the threshold distance is 2 meters.

12. The system according to claim 10, wherein the vehicle portion is a driver side door handle.

13. A non-transitory computer-readable storage medium in a Time-of-Flight (ToF) localization controller, the computer-readable storage medium having instructions stored thereupon which, when executed by a processor, cause the processor to:
determine, via a ToF localization controller, that a user device is less than a threshold distance from a vehicle;
determine an angle of arrival via the ToF localization controller and all antennas in a ToF antenna array comprising a plurality of ToF modules, wherein the plurality of ToF modules provides location coverage in each of a plurality of regions surrounding the vehicle, such that the ToF antenna array provides 360° coverage surrounding the vehicle, and wherein determining the angle of arrival comprises:
performing a first ToF check for a signal received at a first vehicle exterior antenna of the ToF antenna array;
performing a second ToF check for the signal received at a second vehicle exterior antenna of the ToF antenna array;
performing a third ToF check for the signal received at a third vehicle exterior antenna of the ToF antenna array;
performing a fourth ToF check at a plurality of vehicle interior antennae of the ToF antenna array; and
determining that the user device is localized with a first region external to the vehicle using the first ToF check, the second ToF check, the third ToF check, and the fourth ToF check; and
generate an unlock signal that unlocks a vehicle door responsive to determining that a user is less than the threshold distance from the vehicle door.

14. The non-transitory computer-readable storage medium according to claim 13, having further instructions stored thereupon to:
determine, based on the ToF antenna array, that the user device is localized at a 0° position with respect to a front portion of the vehicle;
measure a distance from a vehicle portion to the user device based on a signal time-of-flight value; and
determine, based on the distance, that the user device is less than the threshold distance from the vehicle door.

15. The non-transitory computer-readable storage medium according to claim 13, having further instructions stored thereupon to perform the first ToF check by executing the instructions to:
receive, via the first vehicle exterior antenna, a first signal from the user device, the first signal comprising:
a first ToF value indicative of a first ToF from a first interior antenna to the user device, and
a second ToF value indicative of a second ToF from a second interior antenna to the user device; and
determine, via the ToF localization controller, that the first ToF value is less than the second ToF value.

16. The non-transitory computer-readable storage medium according to claim 13, having further instructions stored thereupon to determine that the user device is less than the threshold distance by executing the instructions to:
receive a ToF signal from a plurality of ToF antennae associated with the ToF antenna array; and
determine, based on the ToF signal, that the user device is less than the threshold distance from a vehicle portion.

17. The non-transitory computer-readable storage medium according to claim 16, wherein the threshold distance is 2 meters.

\* \* \* \* \*